July 26, 1955

R. P. MANSMANN 2,713,777

REFRIGERATED TRUCK BODIES

Filed April 1, 1954

INVENTOR.
Raymond P. Mansmann
BY Jaspert & Cambry
Attorneys 2,713,777
Patented July 26, 1955

2,713,777
REFRIGERATED TRUCK BODIES
Raymond P. Mansmann, Pittsburgh, Pa.

Application April 1, 1954, Serial No. 420,419

2 Claims. (Cl. 62—117)

This invention relates to new and useful improvements in refrigerated truck rear bodies of the type having refrigerating units installed therein and it is among the objects thereof to provide a special removable mounting means for a plug-in type condenser unit arranged in relation to the rear bumper so as to be easily accessible in a milk truck having a short wheel base.

One object of my invention is to provide a removable mounting for a condenser unit which may be placed below the floor of the truck body in such a manner that the unit is easily accessible by quick removal from its mounted position and still be placed so as not to reduce the refrigerated space in a short wheel base milk truck.

A further object of my invention is to place the mounting for compressor unit in such a location as to avoid interference with the chassis of the truck and still not require any change in the overall dimensions of the truck.

A further object of my invention is to provide an arrangement of the compressor mounting so that the electrical and moving mechanical parts of the compressor unit will be protected and stiffened by the plate condenser placed at the front of the mounting and a sector of the bumper positioned at the rear of the mounting. In carrying my invention into practice, I use a plug-in type condensing unit which is used to keep the contents of a refrigerated truck cool only when the truck is not in use. At such times, my condensing unit may be plugged in to maintain the proper refrigerating conditions in the truck. In milk trucks and particularly those with short wheel bases, it is difficult to provide a suitable mounting arrangement for the condenser unit which will permit the truck to be parked in the minimum space and still have the condensing unit available for easy repair and accessibility. In accordance with the present invention, the refrigerating unit or condenser unit is so located that the truck's chassis, together with the condenser plate and mounting base, form a rigid unobtrusive and protective arrangement for the more fragile, electrical and movable mechanical parts. In my prior Patent No. 2,663,163 such a refrigerating or condensing unit was applied to the side of a truck body since the truck used therein had a large wheel base. By means of the present insulation such refrigerating units or condensing units may be mounted in smaller wheel base truck and at the same time obtain better protection for the moving parts thereof and easier accessibility for maintenance of the refrigerating unit.

The invention will become more apparent from a consideration of the accompanying drawing, constituting a part hereof, in which like reference characters designate like parts, and in which—

Figure 1:
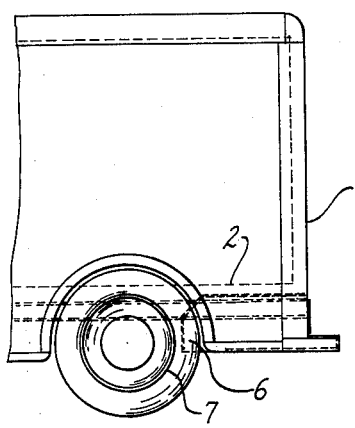
Fig. 1 is a side elevation view of the rear of a refrigerated truck body showing in dotted lines the mounting for the condensing unit.
Figure 2:
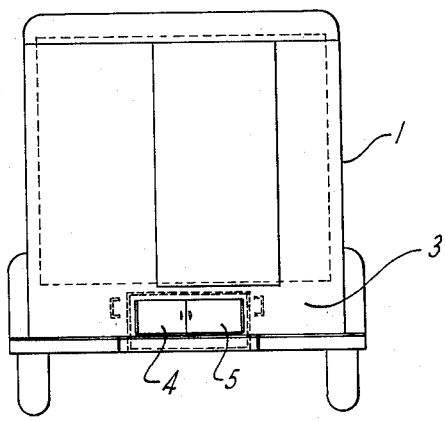
Fig. 2 is a rear view of the truck body showing in dotted lines the outlined location of the condensing unit mounted beneath the floor of the truck.

In the drawing, numeral 1 designates the rear of a milk truck body in which dash line 2 designates the floor. As seen in Fig. 2, the rear of the truck body has lower panel 3 provided with doors 4 and 5 which are used for access or removal of my plug-in condenser unit and its supporting structure. My slidable plug-in condenser unit and its supporting structure designated in its entirety as element 6, is placed beneath the truck body and behind wheel 7.

Figure 3:
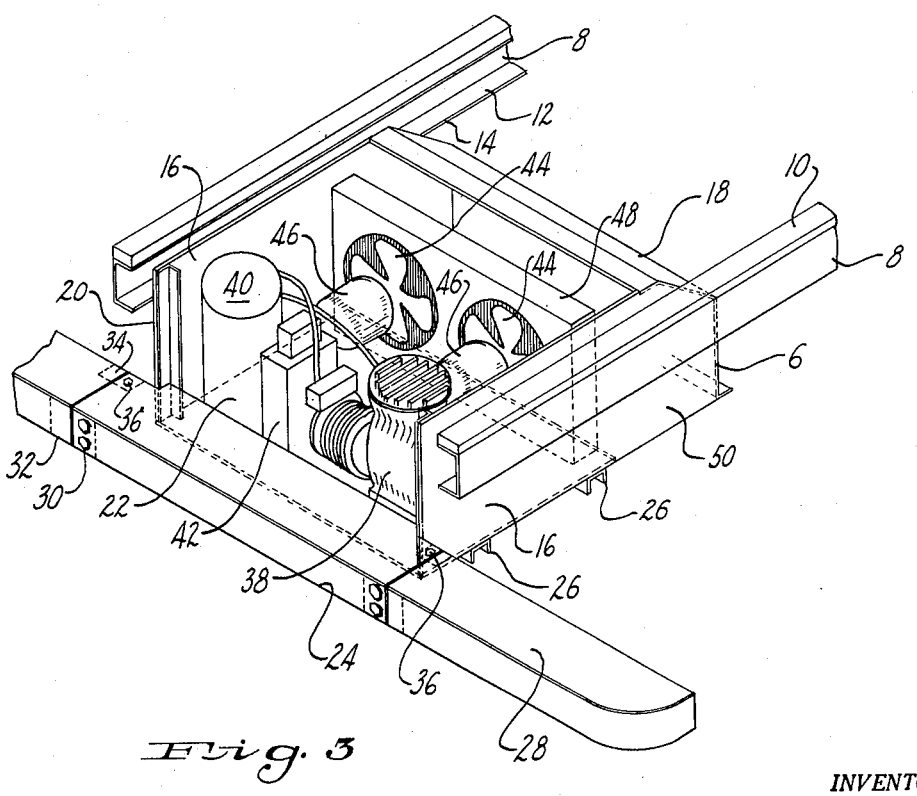
Fig. 3 is a perspective view of the condenser unit and its mounting in the rear of the truck in Fig. 1 supported and protected by a segment of the rear bumper and embodies the principles of this invention.

Referring now more particularly to Fig. 3, which shows the structural arrangement of a condenser unit and its structural support members with respect to lower elements of the truck body, supporting guide channels 8 have a dual purpose in that they maintain floor brace 10 in position beneath the floor of the truck 2 and at the same time serve as guides for the condenser unit when it is slid in and out of the truck body. The channel legs 10 are formed into guides for this purpose by faces 14 on the lower edges of the supporting guide channels.

The movable structural support for the condenser unit forms a space for the working parts by suitable arrangement of the structural members in the manner hereinafter described.

Side plates 16 are joined at their forward position by a bent intake baffle 18. The side plates are also attached at their lower edges to a floor pan 22 which forms a base for the condenser unit to rest on. At the rear end of the side plates 16 is provided vertical side stiffener angles 20 which may conveniently be used both for stiffening and for fastening the condenser unit to a movable bumper part of the truck body in the manner to be next described.

The vertical side stiffener angles are joined to a central bumper segment 24 adjacent their lower ends by welding or other common attachment means. When the central bumper segment is removed the main bumper, the floor pan may be slid to the rear away from the truck body by sliding across the top web of pan support channels 26, which are arranged laterally across the bottom of the pan support. The central bumper segment may be removed from the remainder of the main bumper portion 28 by loosening bolts 30 which are attached to a gusset plate 32 fixed to the inner side of main bumper 28. Bolts 36 must also be removed from a clip plate 34 fastened at the inner rear part of bumper 28, if the central bumper segment is to be removed.

Considering now the condensing unit itself, which comprises a compressor 38 having an integral motor therein, a receiver 40, an electrical control unit 42, intake fans 44 and fan motors 46, which parts are interconnected in an operative assembly in any operative manner well known in the art. The specific arrangement of these parts of the condenser unit do not form a specific part of my invention and they may be conventional assemblies. At the forward end of my condenser unit, however, is the plate condenser element 48 which is arranged in a significant manner to cooperate with the supporting structure. Plate condenser 48 as shown in Figure 3, is a long relatively thin flat rectangular structure which is placed parallel to but spaced apart from the intake baffle 18. By this arrangement, an intake passage is formed between the intake baffle and the plate condenser to supply air for intake fans 44. The plate condenser 48 with its distinctive construction, also forms a brace and guard for the movable parts of a condensing unit, since it abuts the inside edge of side plates 16 at a location which is forward of the moving parts of the unit. Further examination and study of Fig. 3 will reveal that the condenser plate 48 is also parallel to the central bumper segment so that condenser plate and bumper segment interact with side plate 16 to form a rigid and protective arrangement around the electrical and moving parts of the condenser unit.

Although the operation of my device is almost self-evident, an explanation will be given to enable a better understanding of the invention. When the refrigerated truck body has completed its daily run, it may be placed in a garage and doors 4 and 5 opened to allow the plug-in condenser unit to be attached to any convenient electrical outlet in the well known manner that such cooling units are used. When adjustment of the cooling unit is needed or some difficulty has arisen, the central bumper segment 24 may be detached from the main bumper by removing the bolts 30 and bolts 36. This will allow the support structure for the condenser unit to be slid rearward on channels 26 and any suitable and necessary adjustments may be made without interference from the body of the truck.

By conveniently locating the condenser unit at the rear of the truck in the manner herein described, electrical and moving parts of this unit are well protected during normal driving conditions encountered by the operation of the vehicle, since the rear bumper 24, condenser plate 48 and side plates 16 conveniently surround the major portion of the more delicate structure and keep the possibility of injury to these expensive parts to a minimum.

Although one embodiment of the invention has herein been illustrated and described, it will be evident to those skilled in the art that the support structure shown herein may be varied somewhat without departing from the principles set forth in this invention.

I claim the following:

1. In a refrigerator truck body having a short wheel base, a plug-in type condenser unit mounted on a structural base below the floor of the truck at the rear end thereof, said condenser unit having its structural support slidably resting on supports mounted under the body of the truck and fixed at the rear end to a removable central bumper segment, said condenser unit having a transverse intake baffle at the front and constituting a part of said structural support spaced apart from and parallel to a condenser plate element to form an air intake for the condenser unit, intake fans and a compressor mounted on said structural base spaced between said condenser plate element and said removable central bumper.

2. In a refrigerator milk truck body having a floor over a short wheel base, a segmental bumper having a detachable central segment, a plug-in type condenser unit supported between two guide channels and below the floor of the truck on structural members attached at one end to said bumper segment so that the cooling unit may be removed from the truck by detaching the bumper segment, said cooler unit having a plate condenser mounted on said structural members at an opposed end from said bumper segment to constitute a transverse brace with the plates of the condenser extending transversely between the said two guide channels so that the cooling unit may be protected and held in a rigid position by the interaction of the support structure with the bumper segment, plate condenser, and guide channels.

References Cited in the file of this patent

UNITED STATES PATENTS

| | | |
|---|---|---|
| 1,830,467 | Jones | Nov. 3, 1931 |
| 2,260,578 | Murray | Oct. 28, 1941 |
| 2,663,163 | Mansmann | Dec. 22, 1953 |
| 2,667,761 | Sellstrom | Feb. 2, 1954 |